No. 748,106. PATENTED DEC. 29, 1903.
W. D. SARGENT.
BRAKE HEAD.
APPLICATION FILED JUNE 8, 1903.
NO MODEL.

Witness:
F. W. H. Clay
Chas. H. Ebert

Inventor,
William D. Sargent
By Paul Synnestvedt
Att'y.

No. 748,106. Patented December 29, 1903.

UNITED STATES PATENT OFFICE.

WILLIAM D. SARGENT, OF NEW YORK, N. Y., ASSIGNOR TO AMERICAN BRAKE SHOE & FOUNDRY COMPANY, OF NEW YORK, N. Y., A CORPORATION OF NEW JERSEY.

BRAKE-HEAD.

SPECIFICATION forming part of Letters Patent No. 748,106, dated December 29, 1903.

Application filed June 8, 1903. Serial No. 160,476. (No model.)

*To all whom it may concern:*

Be it known that I, WILLIAM D. SARGENT, a citizen of the United States, residing at New York, in the State of New York, have invented a certain new and useful Brake-Head, of which the following is a specification.

My invention relates to wheel brakes and particularly to the means for holding the wearing block or brake shoe upon the brake beam, such as in common use upon railway cars. Its objects are, to provide a brake head which is very small and compact and economical in use of metal; to provide for the use of a cast brake head of the narrow proportions necessary for use where the brake head is mounted directly on the brake beam; to provide a cast brake head with a malleable strengthening element with malleable attaching lugs to co-operate with the attaching lug of the brake shoe; to provide a brake head which allows of the brake shoe being brought in close proximity to the brake beam itself; and to generally improve the construction of brake heads.

The above objects, together with other advantages which will hereinafter appear, I attain by means of the construction illustrated in preferred form in the accompanying drawings, wherein,—

Figure 1:
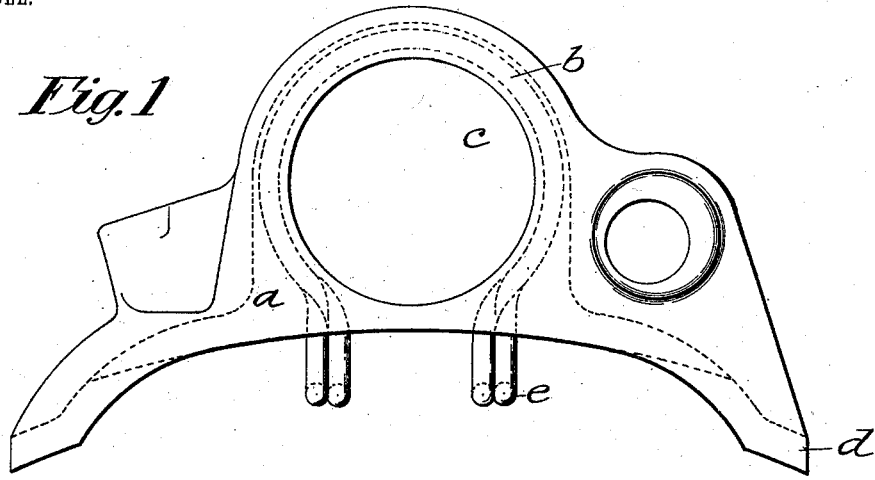
Figure 1 is a side elevation of my improved brake head.
Figure 2:
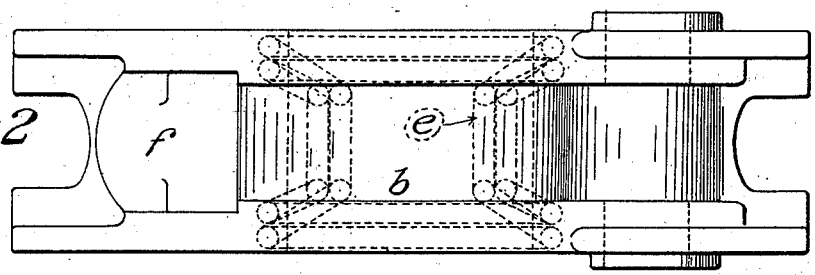
Figure 2 is a top plan view of the same, the wires forming the retaining lugs being shown in dotted lines.
Figure 3:
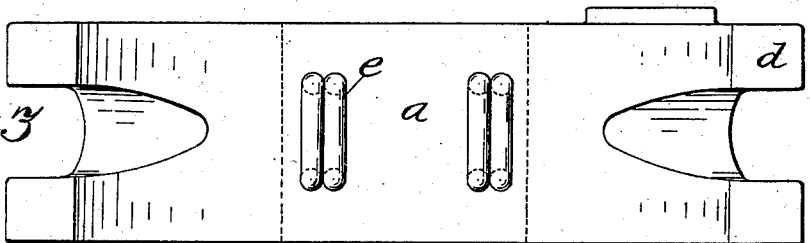
Figure 3 is an under plan view of the same.
Figure 4:
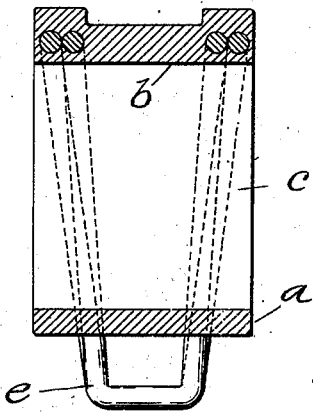
Figure 4 is a central cross sectional view of the brake head.

In common railway practice the brake head is generally made of cast metal in all cases where there is sufficient room between the brake beam and the wheel to allow of the retaining lugs of the brake head being made of cast metal. This requires considerable thickness underneath the open part of the brake head and a considerable thickness of metal in the cast lugs. In those cases where there is not sufficient room between the brake beam and the wheel to allow of the use of the cast lugs it is customary to put the brake head on the beam itself, generally surrounding it by a ring, and in this case the brake shoe and head are made together in one piece, and sometimes the brake head is made of malleable metal. It will be understood that the brake head rests upon the shoe by means of the four feet or legs $d$ as shown in the drawing and that the brake shoe is held in close contact with the head by means of a key which passes through the eye formed by the lugs $e$ and through a central lug upon the brake shoe itself. Since the strain upon the contact legs $d$ of the brake head is purely compression, it may be convenient to form the brake head of cast metal, if provision be made for a proper retaining lug near the center under the brake beam.

In order to improve and simplify the brake head I provide a malleable metal insert, which may be either a series of straps embedded in the metal as in the case of some of the shoes upon the market, or I may use the embedded wires shown in the drawings, which are preferably carried around through the ring $b$ of the brake head and at the bottom are looped and doubled as shown at $e$ to form two central attaching lugs.

Otherwise the lugs $e$ might be formed of a strap of flat metal running through the ring $b$ around the open eye $c$ of the brake head and being provided with openings to allow for the passage of the key through the keyway $f$, as will be understood. But I prefer the construction in which the wires $e$ are used and doubled as shown in the drawings.

By this construction I am enabled to reduce the space between the brake shoe and the brake beam to an extremely small amount, and at the same time greatly strengthen the brake head, since the strap of malleable metal forming the eye lug runs around the brake beam itself and provides a perfectly safe and greatly strengthening key lug. This form of brake head is especially valuable for use in making a combined brake head and shoe of separable parts, but is evidently as useful for any other style of brake head as the one illustrated in the drawings. Other advantages of the device will readily occur to those familiar with their use.

Having thus described my invention and illustrated its use, what I claim, and desire to secure by Letters Patent, is the following:

1. A brake head having malleable attaching lugs embedded in a cast body.

2. A cast brake head having malleable lugs for the attaching key embedded therein.

3. A cast brake head having attaching lugs formed of strips of malleable metal embedded in the casting and running around the eye in the head.

4. A brake head having attaching lugs formed of loops of malleable wires.

5. A brake head having attaching lugs formed of loops of malleable wire embedded in the head in casting.

6. A brake head having attaching lugs formed of malleable wire cast in the metal of the head, and said wires running around the ring inclosing the brake head eye.

7. A brake head formed of cast metal with an eye for the brake beam and having embedded in the metal a loop of wire running around the eye and forming attaching lugs in the face of the head.

8. A cast brake head formed with an open eye and having embedded therein a pair of wrought wires in the ring of the eye and extending below and doubled to form malleable attaching lugs for the brake shoe.

In testimony whereof I have hereunder signed my name in the presence of the two subscribed witnesses.

WILLIAM D. SARGENT.

Witnesses:
BRONSON C. BUXTON,
WILLIAM CONOVER.